United States Patent
Katayama et al.

(10) Patent No.: US 9,205,865 B2
(45) Date of Patent: Dec. 8, 2015

(54) VEHICLE STEERING DEVICE

(71) Applicant: HONDA MOTOR CO., LTD., Tokyo (JP)

(72) Inventors: Hirotaka Katayama, Wako (JP); Yasushi Ueda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/601,436

(22) Filed: Jan. 21, 2015

(65) Prior Publication Data

US 2015/0203152 A1 Jul. 23, 2015

(30) Foreign Application Priority Data

Jan. 21, 2014 (JP) ................................. 2014-008315

(51) Int. Cl.
*B62D 6/00* (2006.01)
*B62D 6/04* (2006.01)
*B62D 6/02* (2006.01)

(52) U.S. Cl.
CPC ........... *B62D 6/002* (2013.01); *B62D 6/02* (2013.01); *B62D 6/04* (2013.01)

(58) Field of Classification Search
None
See application file for complete search history.

(56) References Cited

U.S. PATENT DOCUMENTS

2004/0093140 A1* 5/2004 Inagaki ........................... 701/41
2008/0119986 A1* 5/2008 Wei et al. ....................... 701/41

FOREIGN PATENT DOCUMENTS

JP 2000-128009 A 5/2000

* cited by examiner

*Primary Examiner* — Adam Alharbi
(74) *Attorney, Agent, or Firm* — Westerman, Hattori, Daniels & Adrian, LLP

(57) ABSTRACT

A vehicle steering device includes a control unit that determines a turning angle of wheels in accordance with a steering angle of a steering wheel provided in a vehicle and mechanically separated from the wheels. The control unit determines whether or not a previous vehicle speed is higher than a predetermined speed when a state of a start switch that starts a driving unit of the vehicle is switched from an ON state to an OFF state. If the previous vehicle speed is higher, the control unit continuously turns ON a power supply of the vehicle steering device regardless of a current vehicle speed until a predetermined time elapses, and turns OFF the power supply of the vehicle steering device after the predetermined time elapses. If the previous vehicle speed is not higher, the control unit turns OFF the power supply of the vehicle steering device.

12 Claims, 2 Drawing Sheets

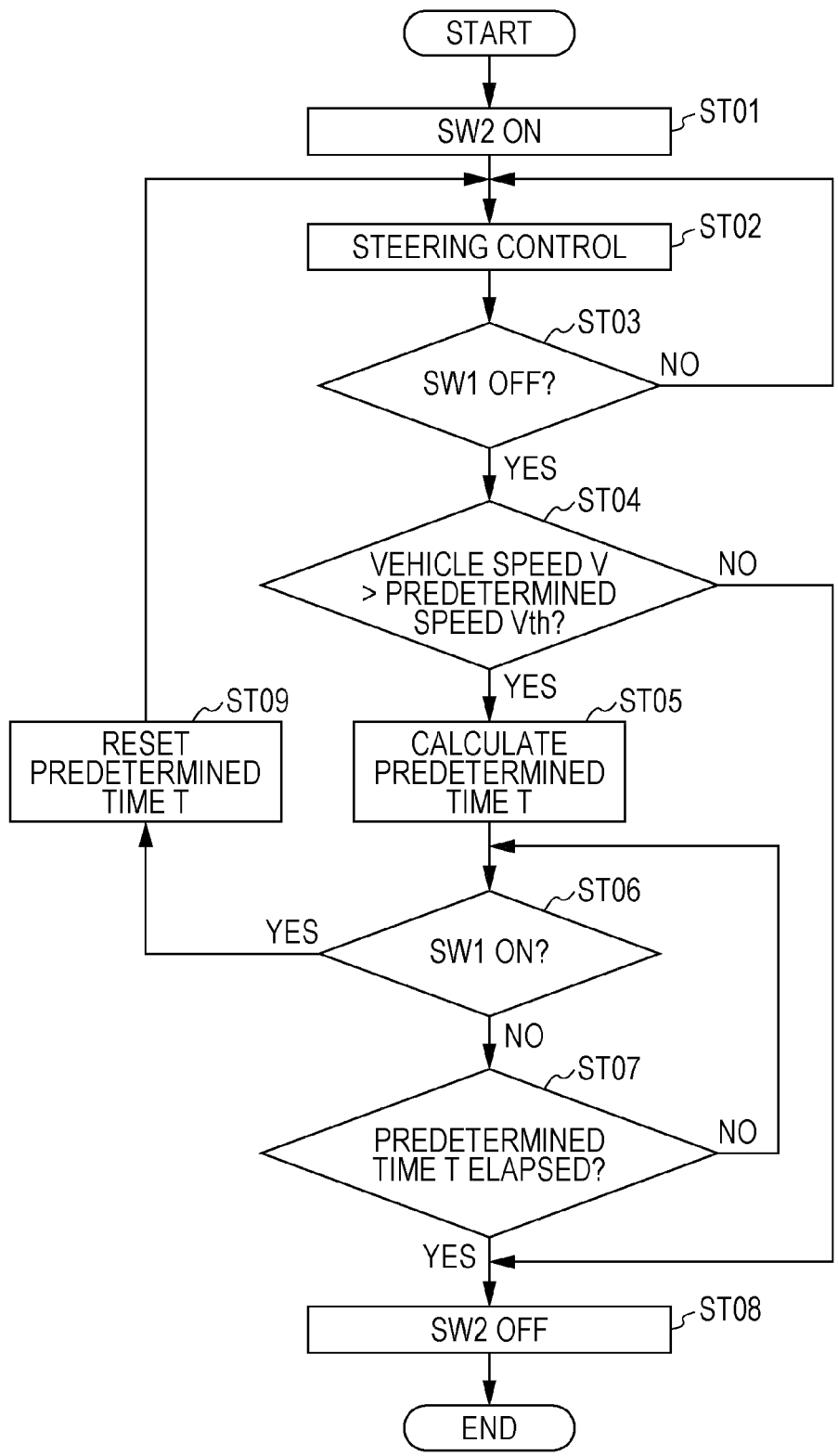

VEHICLE STEERING DEVICE

CROSS REFERENCES TO RELATED APPLICATIONS

The present application claims priority under 35 U.S.C. §119 to Japanese Patent Application No. 2014-008315, filed Jan. 21, 2014, entitled "Vehicle Steering Device." The contents of this application are incorporated herein by reference in their entirety.

TECHNICAL FIELD

The present disclosure relates to a vehicle steering device that determines a turning angle of wheels in accordance with a steering angle of a steering wheel which is mechanically separated from the wheels. The present disclosure more particularly relates to a vehicle steering device that allows an occupant to steer a vehicle for a predetermined time even if a start switch such as an ignition key is turned OFF during driving of the vehicle.

BACKGROUND

For example, Japanese Unexamined Patent Application Publication No. 2000-128009 (hereinafter, referred to as document '009) discloses a device that determines a tuning angle of wheels in accordance with a steering angle of a steering wheel which is mechanically separated from the wheels, as a vehicle steering device. In the vehicle steering device described in the document '009, a steering control unit of the vehicle steering device reads a current vehicle speed from a vehicle speed sensor when a start switch such as an ignition key is turned OFF during driving of a vehicle, and determines whether or not the current vehicle speed is lower than a predetermined speed. If the steering control unit determines that the current vehicle speed is not lower than the predetermined speed, a power supply of the vehicle steering device is not turned OFF. The steering control unit continuously reads the current vehicle speed from the vehicle speed sensor thereafter, and if the steering control unit determines that the current vehicle speed is lower than the predetermined speed, the steering control unit waits for a predetermined time and turns OFF the power supply of the vehicle steering device. The document '009 describes that, with the vehicle steering device, an occupant can continuously steer the vehicle until the vehicle speed becomes lower than the predetermined speed, for example, even when the start switch is unintentionally turned OFF during driving.

Also, the document '009 discloses a configuration in which a capacitor with a large capacitance is connected in parallel to a series circuit including a start switch and a vehicle-mounted battery as another embodiment of the vehicle steering device. With the description in the document '009, in the other embodiment, the capacitor is charged while the start switch is ON, and the power charged in the capacitor is discharged when the start switch is turned OFF and is supplied to the steering control unit. Hence, the document '009 describes that, in the other embodiment of the vehicle steering device, the occupant can continuously steer the vehicle while a discharge voltage of the capacitor is within an operable voltage range of the vehicle steering device, for example, even when the start switch is unintentionally turned OFF during driving.

Meanwhile, the vehicle speed detected by the vehicle speed sensor is also used for other purposes, such as a meter panel or a navigation device, in addition to the vehicle steering device. Hence, the vehicle speed sensor may not be directly connected to the vehicle steering device, and may output a vehicle speed signal through an in-vehicle network such as a control area network (CAN). Then, even if the power supply of the vehicle steering device is not turned OFF when the start switch such as the ignition key is turned OFF, a power supply of a device other than the vehicle steering device is turned OFF. Hence, electric power of the vehicle-mounted battery is not supplied to the vehicle speed sensor or an electronic control unit (ECU) to which the vehicle speed sensor is connected. Therefore, the steering control unit of the vehicle steering device described in the document '009 can no longer read the current vehicle speed from the vehicle speed sensor after the start switch is turned OFF.

Also, in the other embodiment of the vehicle steering device described in the document '009, the occupant can continuously steer the vehicle while the discharge voltage of the capacitor is within the operable voltage range of the vehicle steering device regardless of the current vehicle speed when the start switch such as the ignition key is turned OFF. Hence, the occupant can continuously steer the vehicle for a short time when the discharge voltage is low. Alternatively, it is required to increase the capacitance of the capacitor.

SUMMARY

It is desirable to provide a vehicle steering device that allows an occupant to reliably steer a vehicle for a predetermined time even when a start switch such as an ignition key is turned OFF during driving of the vehicle. Other purposes of this disclosure will be apparent to those skilled in the art with reference to aspects and a desirable embodiment which are exemplified below, and accompanying drawings.

A first aspect according to this disclosure relates to a vehicle steering device including a control unit that determines a turning angle of wheels in accordance with a steering angle of a steering wheel which is provided in a vehicle and mechanically separated from the wheels. The control unit determines whether or not a previous vehicle speed is higher than a predetermined speed when a state of a switch that starts a driving unit of the vehicle is switched from an ON state to an OFF state. If the previous vehicle speed is higher than the predetermined speed, the control unit continuously turns ON a power supply of the vehicle steering device regardless of a current vehicle speed until a predetermined time elapses, and turns OFF the power supply of the vehicle steering device after the predetermined time elapses. If the previous vehicle speed is not higher than the predetermined speed, the control unit turns OFF the power supply of the vehicle steering device.

A control unit of a vehicle steering device determines whether or not a previous vehicle speed is higher than a predetermined speed when a start switch such as an ignition key which is a switch that starts a driving unit of a vehicle is turned OFF. The control unit continuously turns ON a power supply of the vehicle steering device regardless of a current vehicle speed until a predetermined time elapses if the control unit determines that the previous vehicle speed is higher than the predetermined speed. Accordingly, since the control unit does not have to read the current vehicle speed after the start switch such as the ignition key is turned OFF, an occupant can reliably steer the vehicle until the predetermined time elapses even though electric power of a vehicle-mounted battery is not supplied to a part other than the vehicle steering device. Also, the control unit immediately turns OFF the power supply of the vehicle steering device if the control unit determines that the previous vehicle speed is not higher than the predetermined speed. Hence, the turning angle of the wheels is not unintentionally changed by an erroneous operation etc. of the steering wheel.

In a second aspect according to this disclosure, based on the first aspect, the control unit may calculate the predetermined time in accordance with the previous vehicle speed, and a previous driving state and/or a previous driving environment of the vehicle.

Since the control unit calculates the predetermined time which reflects a previous state immediately before the start switch such as the ignition key is turned OFF, even when the start switch such as the ignition key is unintentionally turned OFF during driving of the vehicle, the occupant can move the vehicle to a safety place.

In a third aspect according to this disclosure, based on the first or second aspect, the control unit may determine whether or not the predetermined time has elapsed after the state of the switch is switched from the ON state to the OFF state. The control unit may stop the determination if the state of the switch is switched from the OFF state to the ON state while the control unit determines whether or not the predetermined time has elapsed.

The control unit stops the determination whether or not the predetermined time has elapsed if the start switch such as the ignition key is turned ON again before the predetermined time elapses after the start switch such as the ignition key is turned OFF. Accordingly, even if the occupant unintentionally turns OFF the start switch such as the ignition key, the vehicle can be continuously driven as long as the start switch such as the ignition key is turned ON again before the predetermined time elapses.

BRIEF DESCRIPTION OF THE DRAWINGS

The advantages of the disclosure will become apparent in the following description taken in conjunction with the following drawings.

FIG. 2 is a flowchart showing an operation example of the vehicle steering device according to the embodiment.

DETAILED DESCRIPTION

Figure 1:
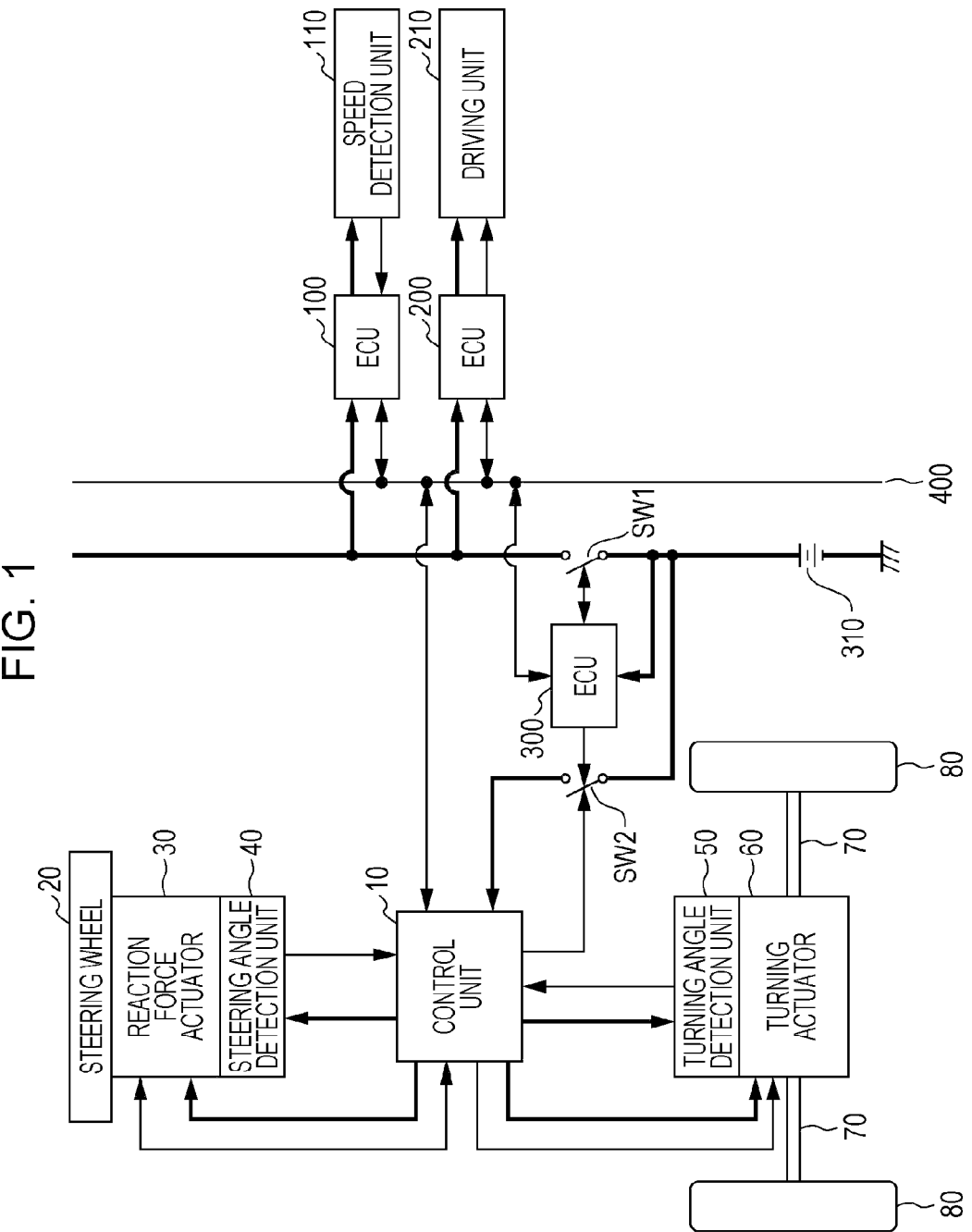
FIG. 1 is a block diagram showing a configuration example of a vehicle steering device according to an embodiment.

A desirable embodiment described below is used for easier understanding of the present disclosure. Hence, those skilled in the art should note that the disclosure is not improperly limited by the embodiment described below.

A configuration example of a vehicle steering device according to the disclosure is described with reference to FIG. 1. The vehicle steering device includes a control unit 10, a steering wheel 20, a steering angle detection unit 40, and a turning actuator 60. The vehicle steering device may further include a reaction force actuator 30, a turning angle detection unit 50, and so on. The steering wheel 20 is mechanically separated or disconnected from wheels 80 and the turning actuator 60 that changes a turning angle of the wheels 80 through turning shafts 70. Also, electric power of a vehicle-mounted battery 310 is supplied to the control unit 10 through a power supply switch SW2 that activates the vehicle steering device, and the electric power of the vehicle-mounted battery 310 is supplied to the reaction force actuator 30, the steering angle detection unit 40, the turning angle detection unit 50, the turning actuator 60, etc., through the control unit 10.

The control unit 10 is formed of, for example, a microcomputer, and can be also called ECU. The ECU has, for example, a central processing unit (CPU), a memory, and an input/output interface (any of these being not shown). The control unit 10 can receive input of an angle detection signal from the steering angle detection unit 40, the turning angle detection unit 50, etc., through the input/output interface, and the control unit 10 can output a control signal to the reaction force actuator 30, the turning actuator 60, etc. Also, the control unit 10 is connected with a vehicle-mounted local area network (LAN) such as a control area network (CAN) 400 through the input/output interface. Hence, for example, the vehicle-mounted LAN can receive input of a signal from an ECU 100 connected with a speed detection unit 110, and can output a signal to an ECU such as an ECU 200 connected with the control unit 10 and a driving unit 210. A thin line connected with the CAN shown in FIG. 1 expresses a flow of input or output of a signal. A thick line connected with the vehicle-mounted battery 310 expresses a flow of supply of electric power by the vehicle-mounted battery 310.

The above-described configuration is merely an example, and the vehicle steering device does not have to include these components, and may only include the control unit 10. Also, the electric power of the vehicle-mounted battery 310 is supplied to the reaction force actuator 30, the steering angle detection unit 40, the turning angle detection unit 50, the turning actuator 60, etc., in the above-described configuration, through the control unit 10. However, the electric power of the vehicle-mounted battery 310 may be directly supplied from the power supply switch SW2 without passing through the control unit 10.

Hereinafter, an operation example of the vehicle including the vehicle steering device according to the disclosure is described. First, when a start switch SW1 such as an ignition key, which is a switch that starts the driving unit 210 by an operation of an occupant, is turned ON, an ECU 300, which is connected with the start switch SW1, outputs a start signal to the CAN 400. Then, the start signal is input to the ECU 200, which is connected with the driving unit 210 through the CAN 400, and the ECU 200 starts the driving unit 210. The driving unit 210 is, for example, a gasoline engine in case of a gasoline vehicle, and a driving motor in case of an electric vehicle. Also, when the start switch SW1 is turned ON, the ECU 300 turns ON the power supply switch SW2 that activates the vehicle steering device.

In this case, the ECU 300 may determine whether or not the ID of a mechanical key or a mobile device of a smart entry system (not shown) meets the ID of the vehicle, and may receive an operation with respect to the start switch SW1 only if it is determined that the IDs meet each other. Alternatively, the ECU 300 may receive an operation with respect to the start switch SW1 only if a signal indicative of that the IDs meet each other determined by another ECU (not shown) is input to the ECU 300.

When the vehicle steering device is activated, a steering angle signal indicative of the steering angle of the steering wheel 20 is input from the steering angle detection unit 40 to the control unit 10. The control unit 10 determines the turning angle of the wheels 80 in accordance with the steering angle indicated by the steering angle signal. The control unit 10 controls the turning actuator 60 so that a current turning angle of the wheels 80 indicated by a turning angle signal input from the turning angle detection unit 50 meets the determined turning angle.

Also, if the control unit 10 determines that the steering angle of the steering wheel 20 is changed from a steering angle in an initial state of the steering wheel 20, the control unit 10 determines the magnitude of a reaction force torque which is applied in a direction opposite to a direction in which the steering wheel 20 is rotated, in accordance with the degree of the steering angle of the steering wheel 20. Then, the control unit 10 controls the reaction force actuator 30 so that a current torque indicated by a torque signal input from a torque detection unit (not shown) provided in, for example, the reaction force actuator 30, meets the determined reaction force torque. The initial state of the steering wheel 20 is a state with an angle of the steering wheel 20 when the vehicle runs straight.

Herein, the degree of the turning angle and the magnitude of the reaction force torque which are determined by the control unit 10 may be determined using the degree of a current vehicle speed V' indicated by a speed signal input through the CAN 400 from the ECU 100 connected with the speed detection unit 110, in addition to the degree of the steering angle of the steering wheel 20.

An operation example when the start switch SW1 such as the ignition key is turned OFF in the vehicle steering device according to the disclosure is described with reference to FIG. 2. In step ST01, when the start switch SW1 is turned ON, the ECU 300 turns ON the power supply switch SW2 that activates the vehicle steering device, and the flow goes to step ST02.

In step ST02, when the power supply switch SW2 is turned ON, the vehicle steering device is activated, and the above-described steering control is executed. That is, the turning angle of the wheels 80 is determined in accordance with the steering angle of the steering wheel 20 (and desirably the current vehicle speed V'), and the turning actuator 60 is controlled so that the current turning angle of the wheels 80 meets the determined turning angle.

In step ST03, the control unit 10 determines whether or not the start switch SW1 is turned OFF during the steering control in step ST02. If the control unit 10 determines that the start switch SW1 is not turned OFF, the flow returns to step ST02, and the steering control is continued. In contrast, if the control unit 10 determines that the start switch SW1 is turned OFF, the flow goes to step ST04.

In step ST04, the control unit 10 determines whether or not a previous (last) vehicle speed V detected by the speed detection unit 110 and input through the CAN 400 is higher than a predetermined speed Vth. Actually, when the start switch SW1 is turned OFF, the electric power of the vehicle-mounted battery 310 is not supplied to an upper side (downstream side) of the start switch SW1 in the thick line connected with the vehicle-mounted battery 310 shown in FIG. 1. Hence, when the start switch SW1 is turned OFF, the speed detection unit 110, and the ECU 100 connected with the speed detection unit 110 do not operate. Therefore, the vehicle speed which is determined whether or not being higher than the predetermined speed Vth by the control unit 10 is not the current vehicle speed V', but is the previous vehicle speed V immediately before the start switch SW1 is turned OFF. The predetermined speed Vth is, for example, 0 [km/h].

In the determination in step ST04, if the control unit 10 determines that the previous vehicle speed V is higher than the predetermined speed Vth, that is, if the control unit 10 determines that the vehicle is moving, the flow goes to step ST05. In contrast, if the control unit 10 determines that the previous vehicle speed V is not higher than the predetermined speed Vth, for example, if the control unit 10 determines that the vehicle is being stopped, the flow goes to step ST08.

In step ST05, the control unit 10 calculates a predetermined time T. The predetermined time T is calculated in accordance with, for example, the previous vehicle speed V used in step ST04, and a previous driving state and/or a previous driving environment of the vehicle. The driving state expresses, for example, whether a road on which the vehicle runs is flat, uphill, or downhill, with reference to an output signal from an ECU connected with a balance detection unit (not shown) of the vehicle. Also, the driving environment expresses, for example, a road on which the vehicle runs is whether a highway or an ordinary road, or whether the road is straight or curved, with reference to information from a navigation device (not shown) etc. The predetermined time T is obtained, for example, by multiplying a time from when the vehicle at the previous vehicle speed V used in step ST04 runs on a flat load by inertia until when a future vehicle speed (expected vehicle speed) becomes 0 [km/h], by a coefficient based on the driving state and/or the driving environment.

In step ST06, the control unit 10 determines whether or not the start switch SW1 is turned ON. If the control unit 10 determines that the start switch SW1 is turned ON, the flow goes to step ST09, in which the predetermined time T is reset, and the flow returns to step ST02. In contrast, if the control unit 10 determines that the start switch SW1 is not turned ON, the flow goes to step ST07.

In step ST07, the control unit 10 determines whether or not the predetermined time T has elapsed since the calculation of the predetermined time T in step ST05. If the control unit 10 determines that the predetermined time T has not elapsed, the flow returns to step ST06. In contrast, if the control unit 10 determines that the predetermined time T has elapsed, the flow goes to step ST08.

In step ST08, the control unit 10 turns OFF the power supply switch SW2 that activates the vehicle steering device, and the flow is ended. Regarding the vehicle steering device, since the power supply of the vehicle steering device is not turned OFF until the predetermined time T elapses, for example, even when the occupant unintentionally turns OFF the start switch SW1 such as the ignition key during driving of the vehicle, the occupant can move the vehicle to a safety place. In contrast, for example, when the occupant stops the vehicle and then turns OFF the start switch SW1 to finish driving, the power supply of the vehicle steering device is turned OFF immediately. Further, for example, even when the occupant unintentionally turns OFF the start switch SW1 during driving of the vehicle, if the occupant turns ON the start switch SW1 again before the predetermined time T elapses, the predetermined time T is reset, and the occupant can continue driving of the vehicle.

In the above description for the operation, the control unit 10 calculates the predetermined time T in step ST05 in accordance with the previous vehicle speed V used in step ST04 and the previous driving state and/or the previous driving environment of the vehicle; however, the configuration is not limited thereto. For example, the predetermined time T may be previously set regardless of the previous vehicle speed V used in step ST04. In this case, in case of normal driving (for example, if the vehicle runs on a flat ordinary road at 60 [km/h]), the predetermined time T is desirably ensured until when a future vehicle speed (expected vehicle speed) becomes 0 [km/h] by inertia. Also, for example, the predetermined time T may be calculated only by the previous vehicle speed V used in step ST04.

The present disclosure is not limited to the above-described exemplary embodiment. Also, those skilled in the art may easily modify the above-described exemplary embodiment within the scope of the claims. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle steering device comprising:
a control unit that determines a turning angle of wheels of a vehicle in accordance with a steering angle of a steering wheel, the steering wheel being provided in the vehicle and mechanically disconnected from the wheels,
wherein, when a state of a switch that starts a driving unit of the vehicle is switched from an ON state to an OFF state, the control unit determines whether or not a previous vehicle speed is higher than a predetermined speed
wherein, if the previous vehicle speed is higher than the predetermined speed, the control unit continuously turns ON a power supply of the vehicle steering device regardless of a current vehicle speed until a predetermined time elapses, and turns OFF the power supply of the vehicle steering device after the predetermined time elapses, and
wherein, if the previous vehicle speed is not higher than the predetermined speed, the control unit turns OFF the power supply of the vehicle steering device.

2. The vehicle steering device according to claim 1, wherein the control unit calculates the predetermined time in accordance with the previous vehicle speed, and a previous driving state and/or a previous driving environment of the vehicle.

3. The vehicle steering device according to claim 1,
wherein the control unit determines whether or not the predetermined time has elapsed after the state of the switch is switched from the ON state to the OFF state, and
wherein the control unit stops determining whether or not the predetermined time has elapsed if the state of the switch is switched from the OFF state to the ON state while the control unit determines whether or not the predetermined time has elapsed.

4. The vehicle steering device according to claim 1, wherein the previous vehicle speed is a vehicle speed of the vehicle just before switching of the switch from the ON state to the OFF state.

5. The vehicle steering device according to claim 2, wherein the previous driving state includes a road on which the vehicle runs is flat, uphill, or downhill.

6. The vehicle steering device according to claim 2, wherein the previous driving environment includes a road on which the vehicle runs is whether a highway or an ordinary road, or whether the road is straight or curved.

7. The vehicle steering device according to claim 1, wherein if the previous vehicle speed is not higher than the predetermined speed, the control unit immediately turns OFF the power supply of the vehicle steering device.

8. The vehicle steering device according to claim 1, wherein the driving unit is an internal combustion engine.

9. The vehicle steering device according to claim 1, wherein the driving unit is a driving motor.

10. A vehicle comprising the vehicle steering device according to claim 1.

11. A vehicle steering device comprising:
a steering wheel provided in a vehicle and mechanically disconnected from wheels of the vehicle,
a controller that determines a turning angle of the wheels of the vehicle in accordance with a steering angle of the steering wheel,
wherein the controller detects a state of a switch that starts a driving unit of the vehicle is switched from an ON state to an OFF state, and when the state of the switch is switched from the ON state to the OFF state, the controller determines whether or not a previous vehicle speed is higher than a predetermined speed,
wherein, if the previous vehicle speed is higher than the predetermined speed, the controller continuously turns ON a power supply of the vehicle steering device regardless of a current vehicle speed until a predetermined time elapses, and turns OFF the power supply of the vehicle steering device after the predetermined time elapses, and
wherein, if the previous vehicle speed is not higher than the predetermined speed, the controller turns OFF the power supply of the vehicle steering device.

12. A method of controlling a vehicle steering device comprising an electronic control unit that determines a turning angle of wheels of a vehicle in accordance with a steering angle of a steering wheel, the steering wheel being provided in the vehicle and mechanically disconnected from the wheels, the method comprising:
detecting by using the electronic control unit, a state of a switch that starts a driving unit of the vehicle is switched from an ON state to an OFF state, and when the state of the switch is switched from the ON state to the OFF state, determining whether or not a previous vehicle speed is higher than a predetermined speed,
if the previous vehicle speed is higher than the predetermined speed, continuously turning ON a power supply of the vehicle steering device regardless of a current vehicle speed until a predetermined time elapses, and turning OFF the power supply of the vehicle steering device after the predetermined time elapses, and
if the previous vehicle speed is not higher than the predetermined speed, turning OFF the power supply of the vehicle steering device.

* * * * *